(12) United States Patent
Gratzer et al.

(10) Patent No.: US 8,280,694 B2
(45) Date of Patent: Oct. 2, 2012

(54) CONSTANT CURRENT POWER SOURCE ELECTRONICS FOR A SENSOR

(75) Inventors: Richard M. Gratzer, Fircrest, WA (US); James Robert Underbrink, Seattle, WA (US)

(73) Assignee: The Boeing Company, Chicago, IL (US)

( * ) Notice: Subject to any disclaimer, the term of this patent is extended or adjusted under 35 U.S.C. 154(b) by 767 days.

(21) Appl. No.: 12/263,755

(22) Filed: Nov. 3, 2008

(65) Prior Publication Data

US 2010/0114534 A1 May 6, 2010

(51) Int. Cl.
*H04B 3/28* (2006.01)
(52) U.S. Cl. .................. 702/191; 702/190; 702/195
(58) Field of Classification Search .................. 702/190, 702/17, 39, 57, 104, 116, 117, 124
See application file for complete search history.

(56) References Cited

U.S. PATENT DOCUMENTS

| | | | |
|---|---|---|---|
| 3,985,024 A | 10/1976 | Horak | |
| 4,554,463 A * | 11/1985 | Norbeck et al. | 307/117 |
| 6,285,161 B1 * | 9/2001 | Popescu | 320/118 |
| 7,154,381 B2 * | 12/2006 | Lang et al. | 340/12.32 |
| 2005/0027453 A1 * | 2/2005 | Fort et al. | 702/14 |
| 2007/0198219 A1 * | 8/2007 | Havela et al. | 702/187 |
| 2007/0230270 A1 | 10/2007 | Calhoun | |
| 2008/0013226 A1 * | 1/2008 | Kirst | 361/18 |
| 2008/0264173 A1 * | 10/2008 | Von Berg et al. | 73/727 |
| 2009/0326870 A1 | 12/2009 | Brusniak | |
| 2010/0114534 A1 | 5/2010 | Gratzer et al. | |

OTHER PUBLICATIONS

U.S. Appl. No. 12/109,791, filed Apr. 25, 2008, Underbrink et al.
Lu, "An Empirical Model for Prediction of Coaxial Jet Noise in Ambient Flow", AIAA 10th Aeroacoustics Conference, Jul. 1986, Seattle, Washington, pp. 1-9.
USPTO office ction for U.S. Appl. No. 12/109,791 dated Sep. 22, 2010.

\* cited by examiner

*Primary Examiner* — Eliseo Ramos Feliciano
*Assistant Examiner* — Paul D Lee
(74) *Attorney, Agent, or Firm* — Yee & Associates, P.C.

(57) ABSTRACT

An apparatus comprises a sensor and a circuit. The sensor is capable of generating a signal in response to detecting a stimulus. The circuit is capable of powering the sensor and providing multiple other capabilities including signal conditioning, non-signal related noise cancellation, and signal transmission using a constant current source power input from a cable and sending the signal over the cable.

27 Claims, 7 Drawing Sheets

CONSTANT CURRENT POWER SOURCE ELECTRONICS FOR A SENSOR

BACKGROUND INFORMATION

1. Field

The present disclosure relates generally to sensors and, in particular, to a method and apparatus for powering a sensor. Still more particularly, the present disclosure relates to a method and apparatus for powering a sensor with integrated electronics using a constant current power source.

2. Background

The measurement of physical quantities is often performed to determine and understand the behavior of physical phenomena. For example, the measurement of noise and the sources or causes of noise is often performed to understand the physics behind the generation of noise. For example, a measurement may be performed to identify where the noise is coming from.

This type of analysis may be performed in the testing of devices. For example, noise data may be collected for an aircraft engine, such as a jet engine. The noise data collected may be analyzed to determine what components within and exterior to the jet engine contribute to the noise. These different components may also be referred to as component noise sources.

Different structures or components in a jet engine or in the jet exhaust generated by a jet engine may contribute different noises at different frequencies. For example, different surfaces within ducts and inlets of a jet engine may contribute noise during the operation of the jet engine. For example, the high speed exhaust flow of a jet engine may contribute noise during the operation of the engine.

Surfaces may be treated with various compounds or components in an effort to reduce noise. With this type of example, the jet engine may be tested with the different types of surfaces to determine whether a noise contribution from those surfaces is reduced with the different treatments.

Currently, arrays of microphones may be used to collect noise data. This noise data may be processed to produce a "picture" of where the noise is coming from, and to determine the intensity of the radiated noise. In obtaining this data, sound sensor units, such as microphones, may be placed at different locations. With current array designs, hundreds or thousands of array locations are needed to cover all the sound propagation paths formed by connecting hundreds of candidate noise source locations to dozens of measurement points of interest.

Each of the microphones in the array is part of a channel to collect data from different noise sources. Each channel within an array may be around $3,000.00 or more. Further, existing microphones and equipment for a channel may have constraints with respect to installation and/or flexibility because of the physical shape and size of the different components. Typically, piezoresistive sensors may be powered using an external direct current constant voltage source.

Signal conditioning electronics also may be located external to and connected to the sensor. These types of configurations require multi-conductor cables to provide connections for excitation, signal transfer, and shielding. These multi-conductor cables may have around four to five wires.

With the complexity and cost of these types of channels, a large initial cost is present to obtain an array of microphones.

SUMMARY

In one advantageous embodiment, an apparatus comprises a sensor and a circuit. The sensor is capable of generating a signal in response to detecting a stimulus. The circuit is capable of powering the sensor using a constant current input from a cable and sending the signal over the cable.

In still another advantageous embodiment, an apparatus comprises a sensor and a circuit. The sensor is capable of generating a signal in response to detecting a stimulus. The circuit is capable of processing the signal using a constant current input from a cable to power the circuit and sending the signal over the cable.

In another advantageous embodiment, an apparatus comprises a plurality of cables, a plurality of sensor units connected to the plurality of cables, and a data acquisition system connected to the plurality of cables. The data acquisition system is capable of sending a constant current to the plurality of sensor units through the plurality of cables and is capable of receiving signals generated by the plurality of sensor units through the plurality of cables.

In yet another advantageous embodiment, a method is present for operating a sensor unit. A constant current is sent to the sensor unit through a cable connected to the sensor unit. A circuit within the sensor unit is powered using the constant current. A signal from the sound sensor unit is received through the cable, wherein the signal is generated by the circuit powered by the constant current.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
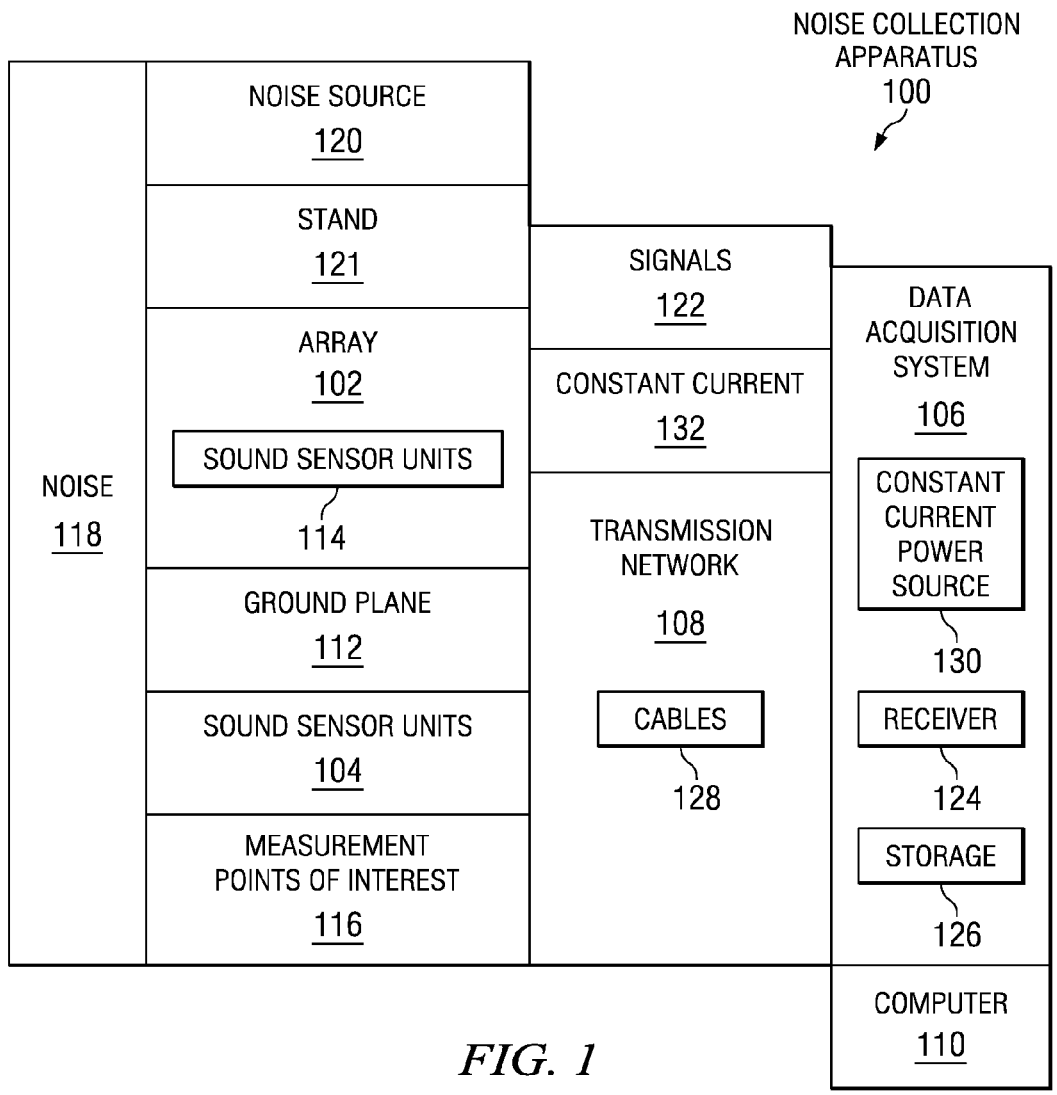
FIG. 1 is a diagram illustrating a noise collection apparatus in accordance with an advantageous embodiment.

With reference now to the figures and, in particular, with reference to FIG. 1, a diagram illustrating a noise collection apparatus is depicted in accordance with an advantageous embodiment. In these examples, noise collection apparatus 100 comprises array 102, sound sensor units 104, data acquisition system 106, transmission network 108, and computer 110.

In these examples, array 102 is located on ground plane 112. In these examples, ground plane 112 may be the ground on which array 102 is placed. In some cases, ground plane 112 may not be a plane in a mathematical sense, because the ground in which array 102 is placed may not be entirely flat. Array 102 is made up of sound sensor units 114 in these examples.

Additional sound sensors in sound sensor units 104 may be located at measurement points of interest 116. These sound sensors may take various forms. For example, without limitation, sound sensor units 104 and 114 may be microphones, hydrophones, laser sensors, seismometers, and/or other suitable sensors. In these examples, sound sensor units 114 and transmission network 108 form channels.

In these illustrative examples, array 102 and sound sensor units 104 and 114 may detect noise 118, which may be generated by noise source 120. In these examples, noise source 120 is mounted on stand 121, which may be above ground plane 112. In these examples, noise source 120 may take various forms such as, for example, without limitation, a jet engine.

Other examples of noise sources include, for example, without limitation, a train, a submarine, a water vehicle, a car, a bus, a stretch of highway (with traffic), a production facility, a building, or some other structure or device that may generate noise. Further, noise source 120 also may be an organic or living noise source. Noise source 120 also may be, for example, without limitation, a crowd of people, a herd of cattle, or some other suitable noise source.

Depending on the particular selection for noise source 120, stand 121 may not be needed. For example, if noise source 120 is a stretch of highway, stand 121 is unnecessary. Instead, array 102 and sound sensor units 104 may be arranged at an appropriate distance from a highway to detect and analyze noise 118 from noise source 120.

Noise 118, detected by sound sensor units 114 in array 102 and sound sensor units 104, causes the generation of signals 122. In turn, signals 122 may be sent to data acquisition system 106 through transmission network 108. Signals 122 may be received by receiver 124 within data acquisition system 106 and stored within storage 126. In these examples, storage 126 is a storage device used to store data in a format usable by a data processing system. Storage 126 may be, for example, a hard disk drive, a floppy disk, a tape drive, or some other suitable storage device. Signals 122 may then be transmitted from storage 126 to computer 110 for analysis.

Transmission network 108 may take various forms. For example, transmission network 108 may be a set of wires connecting sound sensor units 114 and 104 to data acquisition system 106. In these illustrative examples, transmission network 108 contains cables 128. These cables are dual conductor cables connecting data acquisition system 106 to sound sensor units 104 and sound sensor units 114.

In the different advantageous embodiments, data acquisition system 106 also includes constant current power source 130, which generates constant current 132. Constant current 132 is transmitted over cables 128 to sound sensor units 104 and 114. Constant current 132 provides power to these sound sensor units. Further, sound sensor units 104 and 114 send signals 122 back over cables 128 to data acquisition system 106.

In other advantageous embodiments, transmission network 108 may be a set of fiber optic cables and/or wireless transmission links. Of course, a mixture of different types of transmission media also may be used for transmission network 108, depending on the particular implementation. Signals 122 is received by receiver 124 and stored within storage 126. The data in signals 122 contains the potential to create "pictures" of noise 118 over different periods of time.

The different advantageous embodiments recognize that currently, a channel for each sound sensor within sound sensor units 114 in array 102 and sound sensor unit 104 uses a constant direct current voltage that is external to the sensor and typically external to data acquisition system 106. Further, signal conditioning for a particular sound sensor within sound sensor units 114 and 104 is currently external to these sound sensor units and data acquisition system 106.

Also, the different advantageous embodiments recognize that a non-amplified, unconditioned sound sensor output signal is transmitted to a device remote to the location from which the sound sensor is located to condition the signal. These output signals generated by sound sensor units 114 and 104 may be low-level signals, requiring shielding between the sound sensor and signal conditioner to prevent undesirable effects.

These undesirable effects may include changing the signal from sources such as, for example, electromagnetic interference. Further, signal conditioning may include bridge balancing to remove any direct current bias in the signal output. This conditioning also may include alternating current/direct coupling, filtering, and selectable gain.

The different advantageous embodiments recognize that these different solutions currently used for sound sensor units 114 and 104 require additional electronic components located between sound sensor units 114 and 104 and data acquisition system 106. Further, the different advantageous embodiments recognize that current architectures for connecting sound sensor units 114 in array 102 and sound sensor units 104 to data acquisition system 106 may require multi-cable coupling, additional cable connections, shielding for low-level signals, and other factors.

Thus, the different advantageous embodiments provide a method and apparatus for a sound sensor. In the different advantageous embodiments, a constant current source is used to power sound sensor units 114 and 104. This same current source may be used to condition the output signal and drive signals back through transmission network 108 to data acquisition system 106.

In these examples, a channel is formed from a sensor within sound sensor units 114, a cable in cables 128 in transmission network 108 connecting the sensor to data acquisition system 106, and other associated circuitry and components. A cable, as used herein, is a number of wires bound together. A number, as used herein, refers to one or more items. For example, a number of wires is one or more wires. These wires may be bound together in a protective jacket or sheath. Individual wires within the cable may be covered, shielded, and/or insulated. These cables may contain electrical wires, optical fibers, or some combination of the two.

The different advantageous embodiments allow a sensor within sound sensor units 114 and 104 to be directly connected to a constant current source which may be located at data acquisition system 106 in these examples. This type of connection may be performed using a two-wire cable rather than the more complicated cables currently used. Further, the electronic components used to reduce noise and filtering may be located with the sensor instead of at separate locations as found in current sensor systems.

The different advantageous embodiments provide a sensor unit that has a sound sensor capable of generating a signal in response to exacting a sound. This sensor unit also includes a circuit capable of powering the sound sensor using a constant current input from a cable and sending the signal over the cable. Of course, the different advantageous embodiments may be applied to any type of sensor that may be powered.

The illustration of noise collection apparatus 100 in FIG. 1 is not meant to imply physical or architectural limitations to the manner in which other sensor systems may be implemented. Noise collection apparatus 100 is only one example of one type of sensor system in which an advantageous embodiment may be implemented. For example, in another advantageous embodiment, noise collection apparatus 100 may be, for example, without limitation, a fly over array, a wind tunnel array, an aircraft array, or some other sound sensor system. In a wind tunnel array, sound sensor units 114 may be installed in the walls of the wind tunnel to collect acoustic data.

With a fuselage array, sound sensor units 104 may be placed on the outside of a fuselage of an aircraft with data acquisition being performed inside the aircraft to measure turbulent boundary layers and/or engine noise. In yet other advantageous embodiments, noise collection apparatus 100 may collect other types of data instead of, or in addition to, sound. For example, noise collection apparatus 100 may collect temperature data, humidity data, light, radio frequency emissions, radiation, or other suitable quantities that may be measured and converted into a signal.

The different advantageous embodiments may be applied to sound sensing schemes for sound sensor units 104 of various types. For example, the different advantageous embodiments may be applied to sound sensing schemes in which the scheme may be a particular method of transduction to convert a stimulus into an electrical signal. The different schemes that may be implemented in the different advantageous embodiments include, for example, without limitation, piezoresistive, piezoelectric, capacitive, and other suitable sensing schemes.

Further, sound sensor units 104, with other types of sensor systems, may be implemented with other types of sensors. Sound sensor units 104 may be implemented using sound sensors that may require at least one of circuit protection, current steering, power, signal conditioning, line drive, or other suitable functions. For example, sound sensor units 104 may be implemented using at least one of temperature sensors, thermometers, thermistors, bolometers, Hall effect devices, oxygen sensors, photo detectors, infrared sensors, proximity sensors, radiation sensors, subatomic particle sensors, motion sensors, and other suitable types of sensors.

As used herein, the phrase "at least one of", when used with a list of items, means that different combinations of one or more of the items may be used and only one of each item in the list may be needed. For example, "at least one of item A, item B, and item C" may include, for example, item A, or item A and item B. This example also may include item A, item B, and item C, or item B and item C. In other examples, "at least one of" may be, for example, two of item A, one of item B, and ten of item C; four of item B and seven of item C; and other suitable combinations.

In addition, the different advantageous embodiments may be applied to a noise collection apparatus that does not use arrays of sensors. Other arrangements of sensors may be employed depending on the particular implementation.

Figure 2:
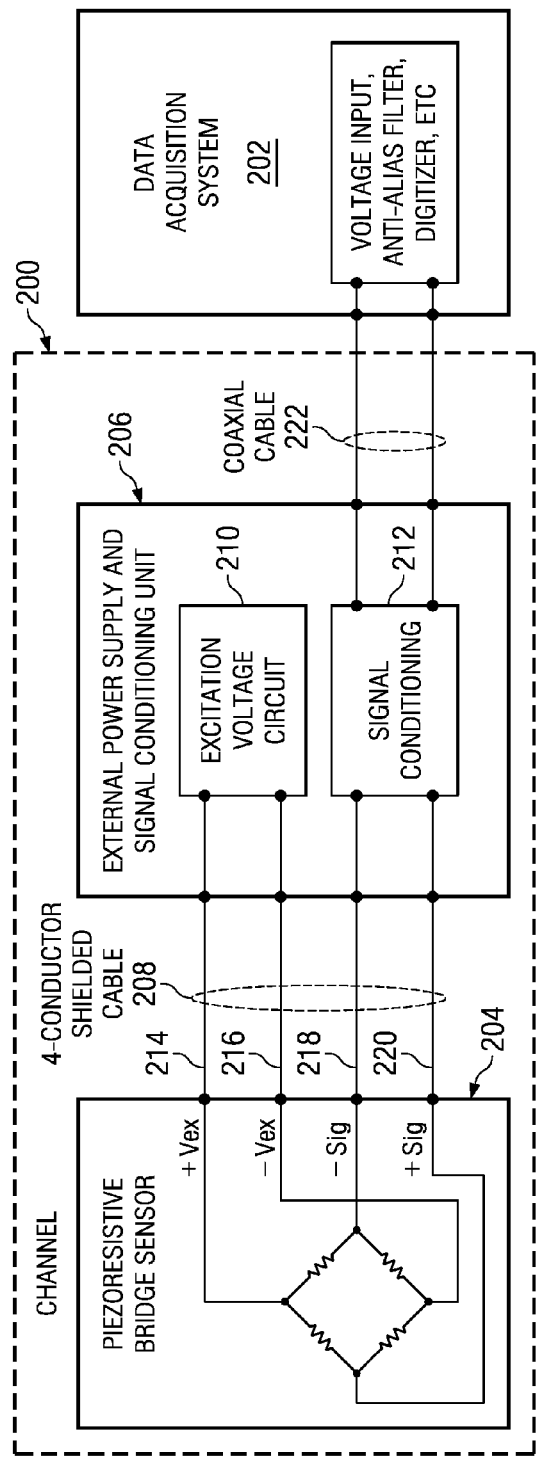
FIG. 2 is a diagram of a currently available channel in accordance with an advantageous embodiment.

With reference now to FIG. 2, a diagram of a currently available channel is depicted in accordance with an advantageous embodiment. In this example, channel 200 is an example of a channel connected to data acquisition system 202. In this example, piezoresistive bridge sensor 204 is connected to external power supply and signal conditioning unit 206 through four-conductor shielded cable 208.

External power supply and signal conditioning unit 206 has excitation voltage circuit 210 and signal conditioning 212. Excitation voltage circuit 210 provides power to piezoresistive bridge sensor 204 through conductors 214 and 216 in four-conductor shielded cable 208.

Conductors 218 and 220 carry signals generated by piezoresistive bridge sensor 204 in response to detecting sound signals. These signals are sent to signal conditioning 212. Signal conditioning 212 may perform conditioning such as, for example, impedance conversion, amplification, filtering, and/or other types of suitable signal conditioning. The conditioned signal may then be sent to data acquisition system 202 through coaxial cable 222.

As can be seen with this currently used system, channel 200 requires a number of different components such as four-conductor shielded cable 208, coaxial cable 222, external power supply and signal conditioning unit 206, and connectors for four-conductor shielded cable 208 and coaxial cable 222. These different components add to the complexity of channel 200 as well as the expense. The different advantageous embodiments recognize that a constant current source generated by a data acquisition system may be used.

Figure 3:
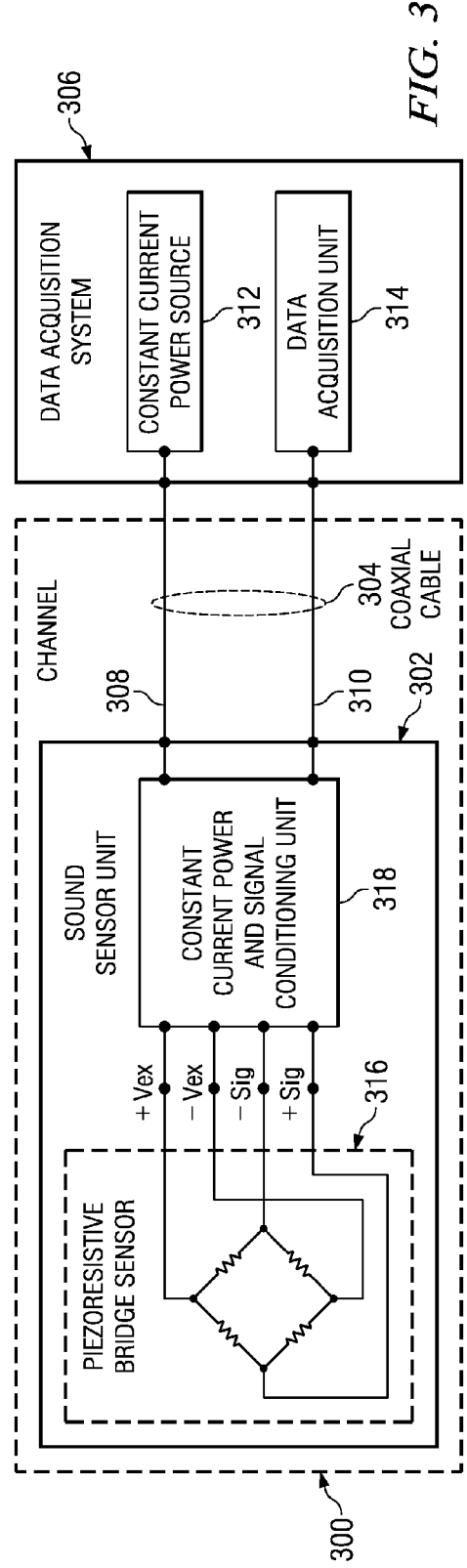
FIG. 3 is a diagram of a sensor channel in accordance with an advantageous embodiment.

With reference now to FIG. 3, a diagram of a sensor channel is depicted in accordance with an advantageous embodiment. In this example, channel 300 is an example of a channel connected to data acquisition system 306. Channel 300 includes sound sensor unit 302 and coaxial cable 304. Coaxial cable 304 connects sound sensor unit 302 with data acquisition system 306. Coaxial cable 304 has conductors 308 and 310. These two conductors carry power for use by sound sensor unit 302 and signals generated by sound sensor unit 302 in response to detecting sound.

Data acquisition system 306 includes constant current power source 312 in addition to data acquisition unit 314. Constant current power source 312 generates a constant current that is sent over coaxial cable 304 to provide constant current power to sound sensor unit 302. Data acquisition unit 314 is a component typically found in data acquisition systems and may include, for example, voltage input, an analog anti-alias filter, a digitizer, and other suitable circuits or systems.

Sound sensor unit 302 contains piezoresistive bridge sensor 316, which is a sound sensor connected to constant current power and signal conditioning unit 318. Constant current power and signal conditioning unit 318 may be an integrated circuit connected to piezoresistive bridge sensor 316. This component may be located in an integrated circuit on a circuit board along with piezoresistive bridge sensor 316. In other advantageous embodiments, piezoresistive bridge sensor 316 and constant current power and signal conditioning unit 318 may be located on the same integrated circuit.

As can be seen, channel 300 requires fewer components than channel 200 in FIG. 2. The reduction in the number of components is provided through the use of constant current that may be delivered by data acquisition system 306 over coaxial cable 304, which also receives signals generated by sound sensor unit 302.

Further, the different components used to provide power in signal conditioning may be integrated into a single unit with piezoresistive bridge sensor 316. This type of architecture also requires fewer connectors. An additional cable is not required beyond coaxial cable 304. In particular, a four-conductor shielded cable, such as four-conductor shielded cable 208 in FIG. 2, is unnecessary. Shielding is not needed within coaxial cable 304 to the extent currently used, because the signals are conditioned prior to being sent across a cable or other type of conductor.

Although, in this particular example, channel 300 is depicted using a sound sensor unit, other advantageous embodiments may imply other types of sensor units. For example, instead of piezoresistive bridge sensor 316, other types of sensors may be employed.

Figure 4:
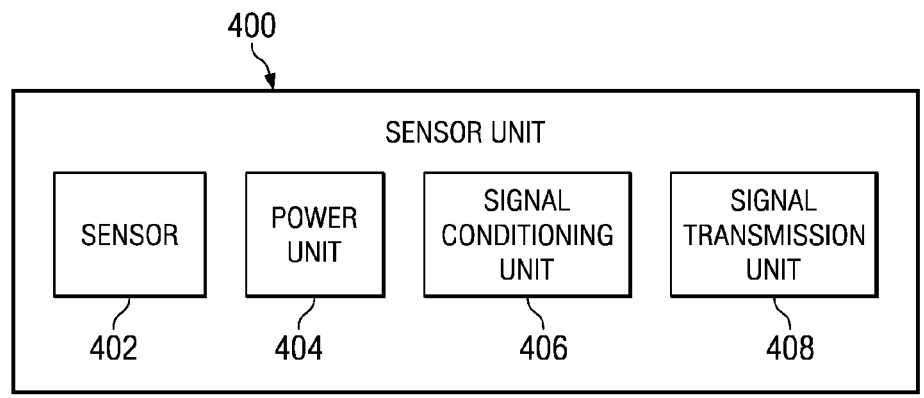
FIG. 4 is a diagram of a sensor unit in accordance with an advantageous embodiment.

With reference now to FIG. 4, a diagram of a sensor unit is depicted in accordance with an advantageous embodiment. In this example, sensor unit 400 is an example of a sensor unit that may be used to implement sound sensor units 104 and sound sensor units 114 in FIG. 1. In particular, sensor unit 400 is an example of components that may be found in sound sensor unit 302 in FIG. 3.

Of course, in other advantageous embodiments, sensor unit 400 may be used to implement other types of sensor units other than those illustrated in sensor unit 400. The different advantageous embodiments may be used to implement any type of sensor unit that is capable of generating a signal in response to a stimulus. For example, the different advantageous embodiments may be used to implement any type of sensor unit that requires power to measure a physical quantity and convert that measurement into a signal.

As depicted, sensor unit 400 includes sensor 402, power unit 404, signal conditioning unit 406, and signal transmission unit 408. Sensor 402 is a sensor that generates a signal in response to detecting a physical quantity. This physical quantity may be, for example, temperature, sound, movement, light, radiation, chemicals, or other suitable types of physical quantities that can be measured. In some advantageous embodiments, the sensor may not require power to detect a signal. For example, a powered sensor may be a piezoresistive sensor, while a sensor that does not require power is a piezoelectric sensor. In either case, whether powered or not powered, the sensor may require power for signal conditioning and line drive to a data acquisition system.

In these examples, sensor 402 may take various forms. For example, without limitation, sensor 402 may be a laser sensor, a seismometer, a temperature sensor, a thermometer, a thermistor, a bolometer, a Hall effect device, an oxygen sensor, a photo detector, an infrared sensor, a proximity sensor, a radiation sensor, a subatomic particle sensor, a motion sensor, and other suitable types of sensors. These sensors may employ various types of sensing schemes such as, for example, without limitation, piezoelectric, piezoresistive, capacitive, and other suitable sensing schemes.

Power unit 404 receives power from a dual conductor cable. This power is a constant current in these examples. Power unit 404 distributes power to sensor 402, signal conditioning unit 406, and signal transmission unit 408. Signal conditioning unit 406 receives signals generated by sensor 402 and conditions these signals prior to transmission to the data acquisition system. Signal transmission unit 408 receives conditioned signal from signal conditioning unit 406 and may return these conditioned signals to the data acquisition system over the same cable on which the constant current is received.

The different components within sensor unit 400 are examples of functions that may be provided for sensor unit 400. In other advantageous embodiments, sensor unit 400 may include fewer components or additional components. For example, in some advantageous embodiments, signal conditioning unit 406 may not be required.

Further, sensor unit 400 may be implemented as a single device and/or integrated circuit. For example, the different components may be located in chips that are connected to each other on a printed circuit board. In yet other advantageous embodiments, one or more of the different components may be integrated onto a single integrated circuit. In other words, the different functional components in sensor unit 400 do not require cables to connect to each other.

Figure 5:
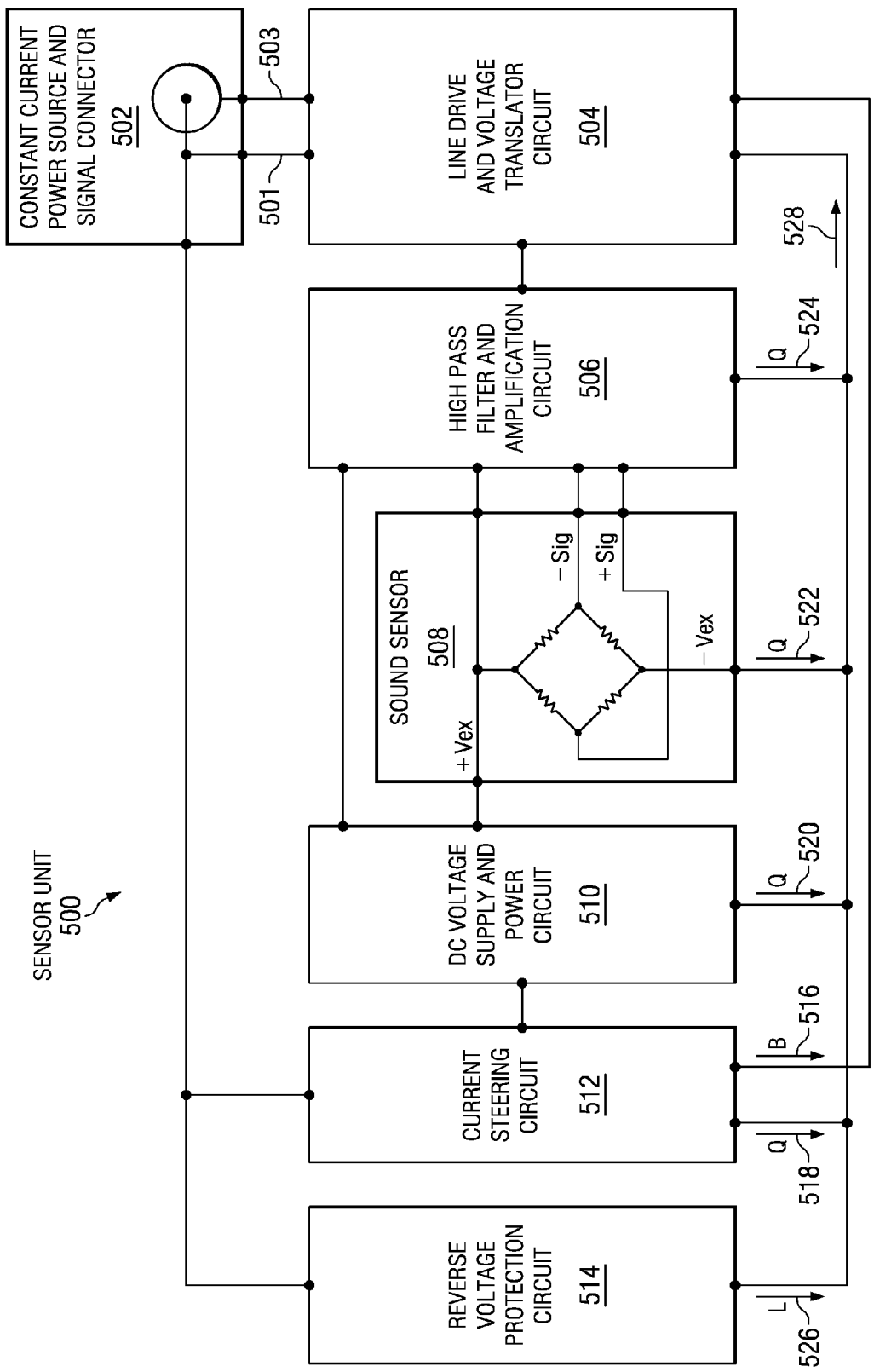
FIG. 5 is a diagram of a sensor unit in accordance with an advantageous embodiment.

With reference now to FIG. 5, a diagram of a sensor unit is depicted in accordance with an advantageous embodiment. Sensor unit 500 is an example of one implementation of a microphone that may be used in sound sensor units 104 and 114 in FIG. 1. Sensor unit 500 is an example of sound sensor unit 302 in FIG. 3. Sensor unit 500 includes constant current power source and signal connector 502, line drive and voltage translator circuit 504, high pass filter and amplification circuit 506, sound sensor 508, direct current voltage supply and power circuit 510, current steering circuit 512, and reverse voltage protection circuit 514.

In these examples, sound sensor 508 is an example of sensor 402 in FIG. 4. Of course, other sensors may be used in place of sound sensor 508 in sensor unit 500, depending on the particular implementation. Line drive and voltage translator circuit 504 is an example of a circuit that may be found in signal transmission unit 408 in FIG. 4. High pass filter and amplification circuit 506 is an example of a circuit that may be found in signal conditioning unit 406 in FIG. 4. Direct current voltage supply and power circuit 510 and current steering circuit 512 are examples of circuits that may be found in power unit 404 in FIG. 4.

Sound sensor 508 may be, for example, a piezoresistive sensor or a piezoelectric sensor. Constant current power source and signal connector 502 provides a connection to receive power from a constant current source as well as to send signals detected by sound sensor 508 for acquisition and processing. Constant current power source and signal connector 502 receives a constant current from a constant current power source such as, for example, a data acquisition system.

Further, constant current power source and signal connector 502 also may receive signals for transmission back to the data acquisition system over the same cable. In this example, constant current power source and signal connector 502 includes signal line 501 and return line 503. Signal line 501 maintains constant current from a constant current power source such as constant current power source 312 in FIG. 3. The voltage on signal line 501 may vary in response to changes in the impedance of the circuit to which it is connected. Return line 503 is the equivalent of a ground. All of the signal current must return to ground in these examples.

Constant current power source and signal connector 502 may be connected to a two-conductor cable that leads to the constant current power source. In these examples, the source may be located in a data acquisition system. Further, the data acquisition system also receives the signals generated by sound sensor 508, conditioned by high pass filter and amplification circuit 506, and transmitted by line drive and voltage translator circuit 504 for acquisition and processing.

Sound sensor 508 may generate signals in response to detecting sounds. These signals may be sent to high pass filter and amplification circuit 506. High pass filter and amplification circuit 506 provides signal conditioning for the output of sound sensor 508. This signal conditioning places the signal into a condition for transmission to a data acquisition system connected to constant current power source and signal connector 502 through a two-conductor cable.

High pass filter and amplification circuit 506 sends the conditioned signal to line drive and voltage translator circuit 504. This component is an amplifier that generates an output voltage that may be sent over constant current power source and signal connector 502.

Direct current voltage supply and power circuit 510 provides power to sound sensor 508. In these examples, the power may be a constant direct current voltage when sound sensor 508 takes the form of a piezoresistive bridge sensor. This component also provides a regulated voltage to other components such as, for example, high pass filter and amplification circuit 506.

Current steering circuit 512 provides a variable current and voltage to the various integrated circuits and components to maintain proper circuit operation of the circuit within sensor unit 500. In other words, current steering circuit 512 is capable of directing power generated from a constant current received from the constant current power source in constant current power source and signal connector 502 to different components within sensor unit 500.

This component also is used to nullify quiescent currents that may be generated by the other components within sensor unit 500. In other words, this circuit is capable of non-signal related current cancellation. This feature helps prevent noise contamination of the signal generated by the sensor from the electronics integrated with the sensor.

As can be seen in this illustrative example, current steering circuit 512 generates dynamic bleed current 516, which is an equal and opposite dynamic current to nullify non-coherent quiescent currents such as quiescent currents 518, 520, 522, and 524, and diode reverse bias leakage current 526. Quiescent currents 518, 520, 522, and 524 are generated by current steering circuit 512, direct current voltage supply and power circuit 510, sound sensor 508, and high pass filter and amplification circuit 506, respectively.

Reverse voltage protection circuit 514 provides protection for the different components within sensor unit 500. In the event that the polarity of the current source from the constant current power source is inadvertently reversed, this circuit protects the electronics contained in current steering circuit 512, direct current voltage supply and power circuit 510, high pass filter and amplification circuit 506, and line drive and voltage translator circuit 504.

Reverse voltage protection circuit 514 may generate a diode reverse bias leakage current 526. Diode reverse bias leakage current 526 and quiescent currents 518, 520, 522, and 524 may form dynamic noise current 528. Dynamic bleed current 516 cancels all the noise in dynamic noise current 528. In this manner, a non-contaminated fully coherent output signal may be generated and sent to constant current power source and signal connector 502 for transmission to the data acquisition system.

The illustration of sensor unit 500 in FIG. 5 is provided as an example of one implementation for a sensor unit and is not meant to imply physical or architectural limitations to the manner in which a sensor unit may be implemented. For example, in some implementations, some components may be unnecessary or other components may be added. Also, in yet other embodiments, other components may be used in addition to or in place of the ones illustrated in sensor unit 500.

As one illustrative example, if sound sensor 508 takes the form of a piezoelectric sensor, then the direct current voltage supply part of direct current voltage supply and power circuit 510 may be unnecessary since the constant voltage excitation for the bridge would not be needed. In yet another advantageous embodiment, a different type of sensor may be used in place of sound sensor 508. For example, a light sensor, a radiation sensor, a motion sensor, or some other suitable sensor may be used within sensor unit 500. In yet other advantageous embodiments, multiple sensors of the same type or different types may be present within sensor unit 500.

In yet other advantageous embodiments, some of the illustrated components may be combined as a single unit. For example, high pass filter and amplification circuit 506 and line drive and voltage translator circuit 504 may be implemented as a single component. In still other advantageous embodiments, some of the other components may be split into multiple components.

Figure 6:
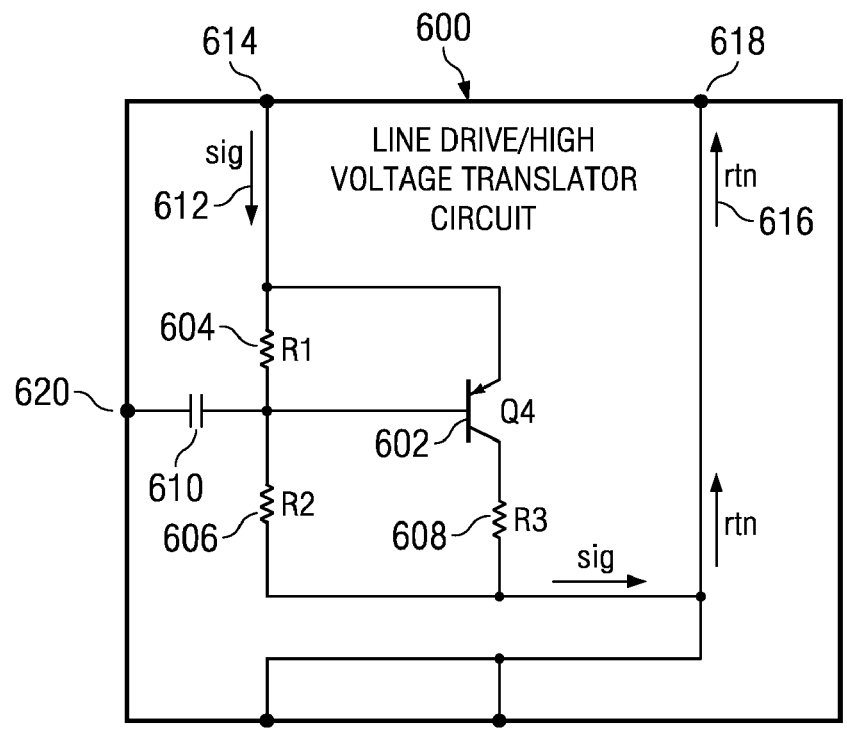
FIG. 6 is a diagram illustrating a line drive and high voltage translator circuit in accordance with an advantageous embodiment.

With reference now to FIG. 6, a diagram illustrating a line drive and high voltage translator circuit is depicted in accordance with an advantageous embodiment. In this example, line drive and high voltage translator circuit 600 is an example of one implementation for line drive and voltage translator circuit 504 in FIG. 5.

In this example, line drive and voltage translator circuit 600 includes transistor 602, resistor 604, resistor 606, resistor 608, and capacitor 610. This circuit is a follower amplifier that draws current at input 614 from the constant current power source to set a direct current bias reference voltage.

Line drive and high voltage translator circuit 600 may output a dynamic voltage signal across input 614 and output 618. The output voltage varies in both positive and negative values from the bias reference voltage. These values are generated in response to the conditioned signal from high pass filter and amplification circuit 506 in FIG. 5 received at input 620.

Transistor 602 takes the form of a PNP transistor and is in a common collector and follower configuration. Transistor 602 works with the constant current source power input at input 614 and the analog input circuit of data acquisition system 106 that also provides constant current power source 130 in FIG. 1 to form a trans-impedance amplifier.

The input signal to transistor 602 from input 620 is alternating current coupled such that only dynamic signals are transferred to the constant current source instrumentation which may include transistor 602, resistor 604, resistor 606, resistor 608, and capacitor 610. Resistors 604 and 606 are used to set a direct current bias voltage on the constant current power signal wire 612. This signal is raised to the direct current bias voltage determined by resistors 604 and 606, in this example.

Resistor 608 improves linearity distortion, as well as temperature and high frequency stability of transistor 602. Resistor 608 may improve linearity distortion by not overloading the transistor. In this manner, the circuit may be used over a range of constant current values such that the different range of currents may be utilized without heating up different components or circuits.

Transistor 602 acts in concert with the constant current power source to provide a low alternating current impedance drive capability. This capability may be used to deliver a voltage signal across input 614 and output 618 to a constant current power source and signal connector, such as constant current power source and signal connector 502 in FIG. 5, in a manner that is minimally affected by electrical properties of interconnected cables such as coaxial cables.

In these examples, this circuit is capable of providing a minimally affected high-frequency response for long cable drive requirements if a suitably large constant current source capacity is available. A high frequency response may be 100 kHz, and a long cable may be 300 feet in these examples.

Figure 7:
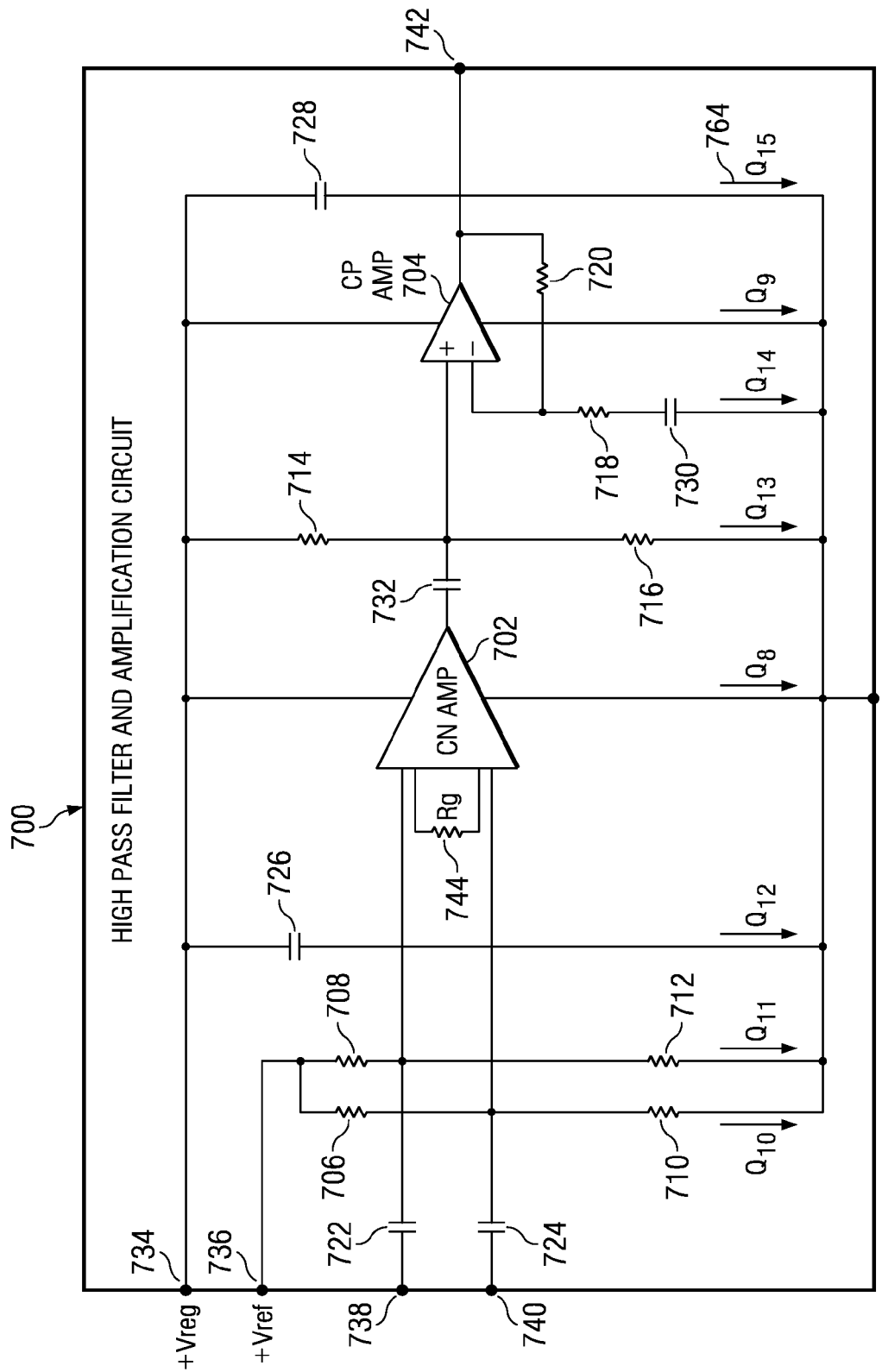
FIG. 7 is a diagram of a high pass filter and amplification circuit in accordance with an advantageous embodiment.

With reference now to FIG. 7, a diagram of a high pass filter and amplification circuit is depicted in accordance with an advantageous embodiment. High pass filter and amplification circuit 700 is an example of one implementation for high pass filter and amplification circuit 506 in FIG. 5.

In this example, high pass filter and amplification circuit 700 includes amplifier 702, amplifier 704, resistors 706-720 and 744, and capacitors 722-730. High pass filter and amplification circuit 700 includes voltage connection 734, voltage connection 736, output connection 737, signal input 738, and signal input 740. High pass filter and amplification circuit 700 also has output 742. This circuit provides signal conditioning for the output from sound sensor 508 in FIG. 5.

In these examples, amplifier 702 is an alternating current coupled instrument amplifier in which capacitors 722 and 724 function as direct current-blocking input capacitors for signal inputs 738 and 740. Resistors 706, 708, 710, and 712 provide for input stage direct current biasing. The gain generated by amplifier 702 may be sufficient to amplify the signal input noise voltages from signal inputs 738 and 740 above the output stage noise of amplifier 702 over the intended system bandwidth. This gain may be such that the amplifier circuit does not increase the noise floor of the sensor unit. If the noise output by the amplifier is higher than the amplified input noise, then sensor performance, such as dynamic range, is degraded.

The gain may be set using pin strapping or by the addition of an external resistor such as, for example, resistor 744. Amplifier 704 may provide a portion of the total circuit gain if the gain bandwidth product of amplifier 702 is insufficient to meet the criteria set for performance. Amplifier 704 is selected to not compromise performance criteria for the system in these examples.

Figure 8:
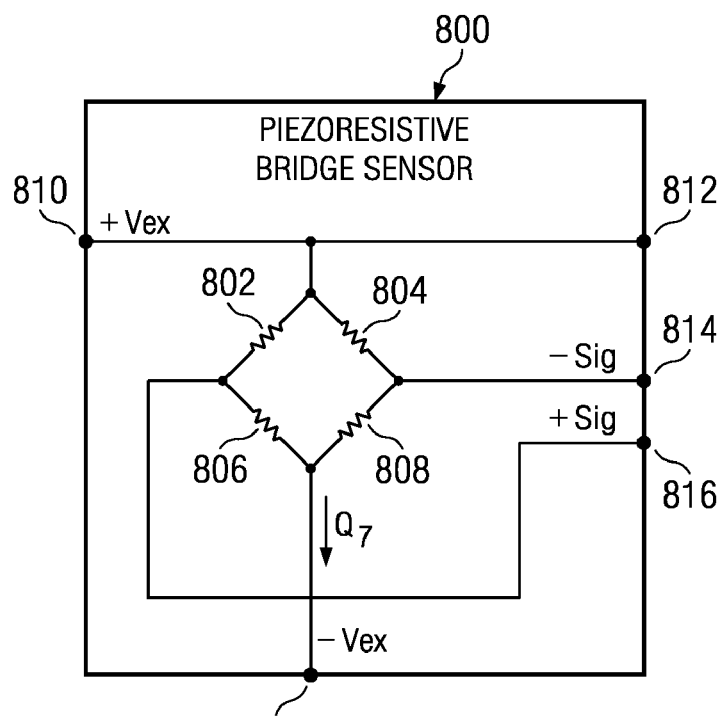
FIG. 8 is a diagram of a sound sensor in accordance with an advantageous embodiment.

With reference now to FIG. 8, a diagram of a sound sensor is depicted in accordance with an advantageous embodiment. In this illustrative example, sound sensor 800 is an example of one implementation for sound sensor 508 in FIG. 5. Sound sensor 800 takes the form of a piezoresistive bridge sensor in these examples. Sensor 800 includes resistors 802, 804, 806, and 808 in these examples.

Sound sensor 800 includes input 810, which may be used to receive a reference voltage from a direct current voltage supply and power circuit, such as direct current voltage supply and power circuit 510 in FIG. 5. Output 812 may be connected to high pass filter and amplification circuit 506 in FIG. 5. Outputs 814 and 816 may be connected to the inputs of high pass filter and amplification circuit 506 in FIG. 5 for signal conditioning.

Resistors 802, 804, 806, and 808 change in value in response to a dynamic pressure change causing a dynamic voltage across outputs 814 and 816, in these examples. Sound sensor 800 also has excitation voltage inputs 810 and 818. Voltage input 810 and voltage input 818 are connected to direct current voltage supply and power circuit 510 in FIG. 5 to receive a constant voltage bridge excitation.

Of course, in other advantageous embodiments, another type of sensor, in addition to or in place of sound sensor 800, may be used. For example, another sensor such as, for example, a motion sensor may be used in addition to sound sensor 800. In other advantageous embodiments, a different type of sensor such as, for example, a temperature sensor, may be implemented in place of sound sensor 800.

Figure 9:
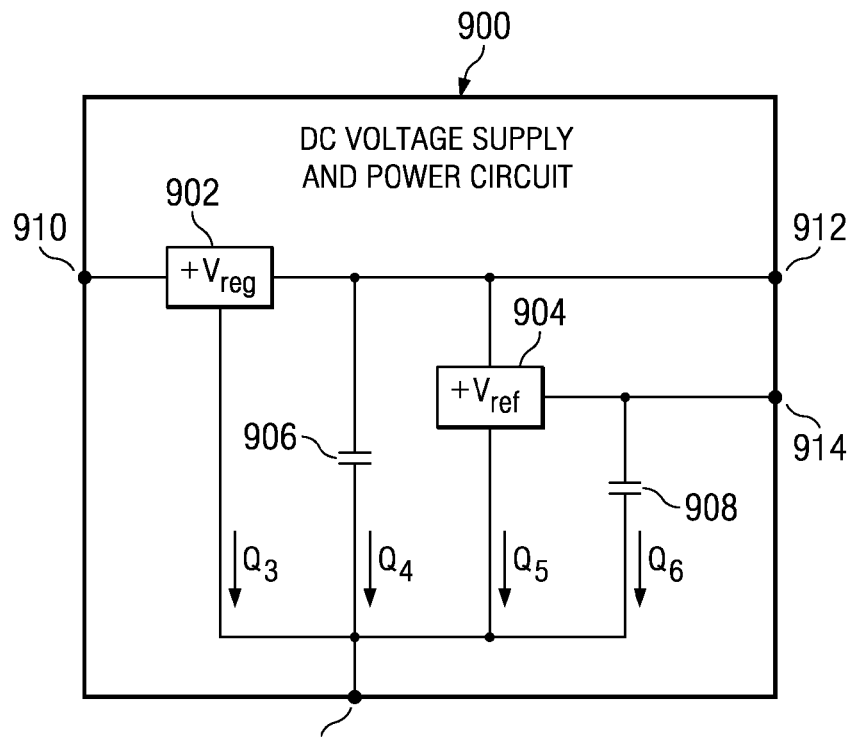
FIG. 9 is a diagram of a direct current voltage supply and power circuit in accordance with an advantageous embodiment.

With reference now to FIG. 9, a diagram of a direct current voltage supply and power circuit is depicted in accordance with an advantageous embodiment. Direct current voltage supply and power circuit 900 is an example of one implementation for direct current voltage supply and power circuit 510 in FIG. 5. Direct current voltage supply and power circuit 900 includes connection 910, connection 912, connection 914, and connection 916.

In this example, direct current voltage supply and power circuit 900 includes voltage regulator 902, voltage reference 904, capacitor 906, and capacitor 908. Voltage regulator 902 may take the form of a low drop-out (LDO) type voltage regulator in an integrated circuit chip with capacitor 906 functioning as an output filter.

Voltage regulator 902 draws input power from connection 910, which provides a connection to current steering circuit 512 in FIG. 5. Voltage regulator 902 maintains output voltage regulation regardless of input voltages over a specified range determined by the regulator characteristics. A low drop-out type regulator allows wide dynamic range for input voltage. This type of regulator allows the dynamic output signal voltage of the transducer package to swing to low levels without driving the voltage regulator into cutoff, in these examples.

Direct current voltage supply and power circuit 900 has output 914 and output 916 connected to sound sensor 508 in FIG. 5 to provide excitation voltages. Output 912 of direct current voltage supply and power circuit 900 connects to high pass filter and amplification circuit 506 in FIG. 5 to provide a reference voltage to high pass filter and amplification circuit 506.

The reference voltage generated by direct current voltage supply and power circuit 900 has a precision output voltage and minimum temperature drift that maintains a desired sensitivity for a sound sensor in the form of a piezoresistive bridge sensor over various temperature ranges. The temperature stability provided by direct current voltage supply and power circuit 900 may be determined by part selection and current buffering to minimize temperature drift. Further, capacitors 906 and 908 may be employed to minimize the differential output noise as measured across the outputs of the sound sensor. These outputs are, for example, output 814 and 816 in FIG. 8.

Figure 10:
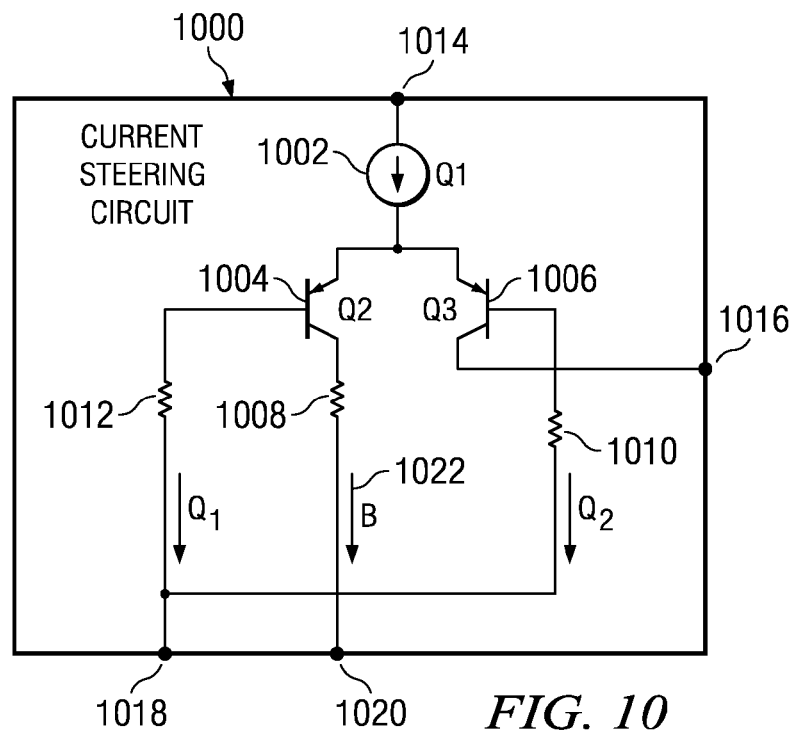
FIG. 10 is a diagram of a current steering circuit in accordance with an advantageous embodiment.

With reference now to FIG. 10, a diagram of a current steering circuit is depicted in accordance with an advantageous embodiment. Current steering circuit 1000 is an example of one implementation of current steering circuit 512 in FIG. 5. In this illustrative example, current steering circuit 1000 includes current source 1002, transistor 1004, transistor 1006, resistor 1008, resistor 1010, and resistor 1012. Current steering circuit 1000 includes input 1014, output 1016, output 1018, and output 1020.

Current source 1002 functions as a current regulating element to maintain a constant current flow through current steering circuit 1000. Transistor 1006 provides power to direct current voltage supply and power circuit 510 in FIG. 5. Transistor 1004 detects quiescent and capacitor charging currents and generates dynamic bleed current 1022 whose purpose is to nullify non-signal related output currents. This current is nearly equal to and opposite of the sum of all of the quiescent currents and the reverse bias leakage current that may be generated within a sensor unit.

Acoustic actuation of a sound sensor, such as sound sensor 508 in FIG. 5, generates an output signal that also causes active and passive components within the sound sensor to generate phase shifted currents. These phase shifted currents may try to flow in the return wire 616 in FIG. 6. The change in the current may be detected and compensated by transistor 1004 in these examples.

Figure 11:
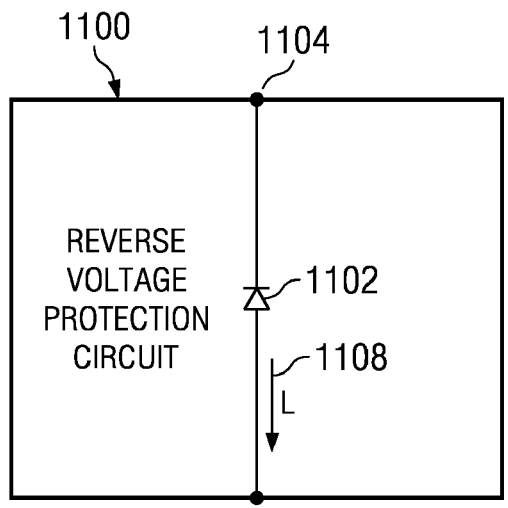
FIG. 11 is a diagram illustrating reverse voltage protection circuit in accordance with an advantageous embodiment.

With reference now to FIG. 11, a diagram illustrating reverse voltage protection circuit is depicted in accordance with an advantageous embodiment. Reverse voltage protection circuit 1100 is an example of one implementation for reverse voltage protection circuit 514 in FIG. 5. Reverse voltage protection circuit 1100 includes diode 1102 and has input 1104 and output 1106.

Diode 1102 provides protection in the event that power is accidentally connected in a reverse polarity. Diode 1102 may function as a protection diode and may be selected to be a low-leakage diode and capable of shunting the full amount of current that may be provided by the constant current source. In normal operation, diode 1102 is reverse biased and may allow leakage current 1108.

The illustration of the circuits in FIGS. 4-11 are not meant to imply physical or architectural limitations to the manner in which the different circuits may be implemented. The particular circuits depicted in these figures have been presented for purposes of illustrating one manner in which these circuits may be implemented.

In other advantageous embodiments, other types of circuit designs and/or components may be used to implement and provide the functionality of the different illustrative circuits. For example, other types of signal conditioning circuits and sensor circuits may be used in accordance with other advantageous embodiments. In some advantageous embodiments, one or more additional signal conditioning circuits may be used to supplement the ones illustrated in these examples.

Figure 12:
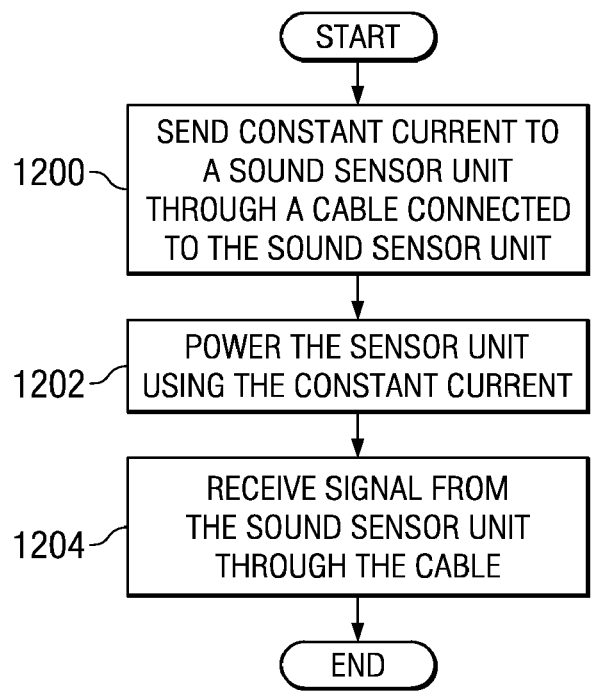
FIG. 12 is a flowchart of a process for a sound sensor unit in accordance with an advantageous embodiment.

With reference next to FIG. 12, a flowchart of a process for a sound sensor unit is depicted in accordance with an advantageous embodiment. The sensor unit may be, for example, sensor unit 500 in FIG. 5.

The process begins by sending a constant current to the sensor unit through a cable connected to the sensor unit (operation 1200). In these examples, the sensor unit may be, for example, sensor unit 400 in FIG. 4, and may include sensor 402 and power unit 404. In some advantageous embodiments, sensor unit 400 also may include signal conditioning unit 406 and signal transmission unit 408 in FIG. 4.

The sensor unit is powered using the constant current (operation 1202). In particular, the constant current is used by a power unit within the sensor unit to power one or more components within the sensor unit. In these examples, the component is a sensor. In other advantageous embodiments, a signal conditioning unit and a signal transmission unit also may be powered by the power unit. In response to powering the sensor unit, a signal is received from the sound sensor unit through the cable (operation 1204) with the process terminating thereafter.

Thus, the different advantageous embodiments provide a method and apparatus for a sensor unit. In one advantageous embodiment, a sensor is capable of generating a signal in response to detecting a stimulus. The sensor unit also includes a circuit capable of powering the sensor using a constant current input from a cable and sending the signal generated by the sensor unit over the cable.

The different advantageous embodiments may use a plurality of sensor units in a noise detection system such as, for example, noise collection apparatus 100 in FIG. 1. In particular, the sound sensor units may be employed in sound sensor units 104 and sound sensor units 114 in FIG. 1, in these examples.

With the different advantageous embodiments, the electronics typically used between a sensor and data acquisition system, such as multi-conductor cabling, extra cable connections, low-level signals between sensor and signal conditioning circuits, and other undesirable features of currently existing systems, may be avoided.

The different advantageous embodiments provide a capability to integrate a circuit currently located in physical components that may be connected to a sound sensor by cables on the same board or circuit as the sound sensor. Further, the different advantageous embodiments may reduce the number of connections and complexity of cables through using a constant current generated by a data acquisition system and sent through a single cable. This same cable may be used to transmit signals back to the data acquisition system.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a sensor configured to generate a signal in response to detecting a stimulus; and
a circuit configured to power the sensor using a constant current input from a cable while sending the signal over the cable, wherein the circuit further comprises:
a direct current voltage supply configured to supply the constant current input; and
a current steering circuit connected to the constant current input and to the sensor, wherein the current steering circuit is configured to direct power from the constant current input to the sensor, and wherein the current steering circuit is further configured to nullify a non-signal related current in the circuit by generating a bleed current which comprises about an equal and opposite current to the non-signal related current.

2. The apparatus of claim 1 further comprising:
a sensor unit containing the sensor and the circuit.

3. The apparatus of claim 2 further comprising:
a data acquisition system, wherein the cable connects the data acquisition system to the sensor unit and wherein the data acquisition system is capable of generating the constant current input and capable of receiving the signal.

4. The apparatus of claim 2, wherein the sensor and the circuit are each located on at least one of a printed circuit board and an integrated circuit.

5. The apparatus of claim 2, wherein the sensor is a first sensor and further comprising:
a second sensor located within the sensor unit.

6. The apparatus of claim 5, wherein the first sensor is a first type of sensor and the second sensor is a second type of sensor.

7. The apparatus of claim 1, wherein the circuit further comprises:
a signal conditioning unit connected to the sensor and the current steering circuit.

8. The apparatus of claim 7, wherein the signal conditioning unit comprises:
a high pass filter and amplification circuit.

9. The apparatus of claim 7 further comprising:
a reverse voltage protection circuit connected to the sensor, the direct current voltage supply, the current steering circuit, and the signal conditioning unit.

10. The apparatus of claim 9, wherein the reverse voltage protection circuit comprises: further comprising:
a line drive and voltage translator circuit.

11. The apparatus of claim 1, wherein the sensor is selected from one of a piezoresistive sensor, a piezoelectric sensor, a capacitive sensor, a laser sensor, a seismometer, a temperature sensor, a thermometer, a thermistor, a bolometer, a Hall effect device, an oxygen sensor, a photo detector, an infrared sensor, a proximity sensor, a radiation sensor, a subatomic particle sensor, and a motion sensor.

12. The apparatus of claim 1, wherein the circuit further comprises of a signal conditioning unit and a signal transmission unit and wherein the current steering circuit is further configured to supply power to all of the sensor, the signal conditioning unit, and the signal transmission unit.

13. A sensor unit comprising:
a sensor configured to generate a signal in response to detecting a stimulus;
a power supply connected to the sensor, the power supply configured to generate a constant current input;
a current steering circuit connected to the power supply and to the sensor, wherein the current steering circuit is configured to direct power from the constant current input to the sensor, and wherein the current steering circuit is further configured to nullify a non-signal related current by generating a bleed current which comprises about an equal and opposite current to the non-signal related current;

a high pass filter and amplification circuit connected to the current steering circuit, the power supply, and the sensor, wherein the high pass filter and the amplification circuit together are configured to condition the signal to form a conditioned signal; and a reverse voltage protection circuit connected to the sensor, the power supply, the current steering circuit, and the high pass filter and amplification circuit, wherein the reverse voltage protection circuit comprises a line drive and voltage translator circuit configured to send the conditioned signal over a cable that also provides the constant current input.

14. An apparatus comprising:

a cable;

a plurality of sensor units connected to the cable; and a data acquisition system connected to the cable, wherein the data acquisition system is configured to send a constant current to the plurality of sensor units through the cable while receiving signals generated by the plurality of sensor units through the cable; and a power unit connected to the plurality of sensor units and to the cable, wherein the power unit comprises:
  a direct current voltage supply and power circuit; and
  a current steering circuit connected to the direct current voltage supply, the power circuit, and the plurality of sensor units, wherein the current steering circuit is configured to perform non-signal related current cancellation by generating a bleed current which comprises about an equal and opposite current to a non-signal related current.

15. The apparatus of claim 14, wherein the plurality of sensor units comprises at least one of a number of piezoresistive sensors and a number of piezoelectric sensors.

16. The apparatus of claim 14, wherein the plurality of sensor units further comprises:

a signal conditioning unit connected to the plurality of sensor units.

17. The apparatus of claim 16, wherein the signal conditioning unit comprises:

a high pass filter and amplification circuit.

18. The apparatus of claim 14, wherein the plurality of sensor each comprise one of a piezoresistive sensor and a piezoelectric sensor.

19. The apparatus of claim 18, further comprising:

a reverse voltage protection circuit connected to the power unit.

20. The apparatus of claim 18, further comprising:

a line drive and voltage translator circuit connected to the power unit.

21. A method for operating a sensor unit, the method comprising:

sending a constant current to the sensor unit through a cable connected to the sensor unit, wherein the sensor unit comprises a sensor;

powering a circuit within the sensor unit using the constant current, wherein the circuit comprises the sensor, a power unit connected to the sensor, and at least one of a signal conditioning unit connected to the sensor and the power unit and a signal transmission unit connected to the sensor and the power unit, and wherein the power unit further comprises a direct current voltage supply and power circuit and a current steering circuit connected to the sensor unit and the direct current voltage supply and power circuit;

receiving a signal from the sensor unit through the cable while powering the circuit, wherein the signal is generated by the circuit powered by the constant current;

using the current steering circuit to direct power from the constant current to the sensor; and using the constant steering circuit to nullify a non-signal related current by generating a bleed current which comprises about an equal and opposite current to the non-signal related current.

22. The method of claim 21, wherein the sensor is selected from one of a piezoresistive sensor, a piezoelectric sensor, a capacitive sensor, a laser sensor, a seismometer, a temperature sensor, a thermometer, a thermistor, a bolometer, a Hall effect device, an oxygen sensor, a photo detector, an infrared sensor, a proximity sensor, a radiation sensor, a subatomic particle sensor, and a motion sensor.

23. The method of claim 21, wherein the signal conditioning unit comprises:

a high pass filter and amplification circuit.

24. The method of claim 21, further comprising:

using a reverse voltage protection circuit, which is connected to the circuit, to shunt some or all of the constant current.

25. The method of claim 24 further comprising:

using a line drive and voltage translator circuit, which is connected to the circuit, to draw current from the constant current to direct a current bias reference voltage.

26. The method of claim 21, wherein the sensor and the circuit are each located on at least one of a printed circuit board and an integrated circuit.

27. The method of claim 21, wherein the circuit further comprises at least one of the signal conditioning unit and the signal transmission unit, and wherein the method further comprises:

using the power unit to supply power to the sensor, the signal conditioning unit, and the signal transmission unit.

* * * * *